US010216733B2

(12) United States Patent
Homer

(10) Patent No.: US 10,216,733 B2
(45) Date of Patent: Feb. 26, 2019

(54) SMART COMMENTING SOFTWARE

(76) Inventor: Gregg S. Homer, Sherman Oaks, CA (US)

(*) Notice: Subject to any disclaimer, the term of this patent is extended or adjusted under 35 U.S.C. 154(b) by 1123 days.

(21) Appl. No.: 11/735,460

(22) Filed: Apr. 14, 2007

(65) Prior Publication Data
US 2015/0074145 A1 Mar. 12, 2015

Related U.S. Application Data

(60) Provisional application No. 60/744,915, filed on Apr. 14, 2006.

(51) Int. Cl.
G06F 17/30 (2006.01)

(52) U.S. Cl.
CPC .............. *G06F 17/30011* (2013.01)

(58) Field of Classification Search
CPC .. G06F 17/2288; G06F 17/24; G06F 17/2211; G06F 17/211; G06F 17/241; G06F 17/30867; G06F 17/21; G06F 17/20; G06F 17/2705; G06F 17/2735; G06F 17/30; G06F 17/3002; G06F 17/30091; G06F 17/30265; G06F 17/30283; G06F 17/30525
USPC .............. 715/203, 230, 231, 232, 206, 229; 707/706
See application file for complete search history.

(56) References Cited

U.S. PATENT DOCUMENTS

| 5,692,206 | A | * | 11/1997 | Shirley ............... G06F 17/2881 706/902 |
| 5,822,720 | A | | 10/1998 | Bookman et al. |
| 5,950,194 | A | | 9/1999 | Bennett et al. |
| 6,055,531 | A | | 4/2000 | Bennett et al. |
| 6,065,026 | A | * | 5/2000 | Cornelia et al. .............. 715/202 |
| 6,178,431 | B1 | * | 1/2001 | Douglas ........................ 715/205 |
| 6,266,683 | B1 | * | 7/2001 | Yehuda et al. ................ 715/234 |
| 6,311,151 | B1 | | 10/2001 | Yamamoto et al. |
| 6,438,566 | B1 | | 8/2002 | Okuno et al. |
| 6,687,878 | B1 | | 2/2004 | Eintracht et al. |
| 6,865,713 | B1 | * | 3/2005 | Bates et al. ................... 715/233 |
| 6,950,982 | B1 | * | 9/2005 | Dourish ........................ 715/234 |
| 7,966,556 | B1 | * | 6/2011 | Bourdev ........................ 715/230 |
| 2001/0047290 | A1 | * | 11/2001 | Petras et al. .................... 705/10 |

(Continued)

FOREIGN PATENT DOCUMENTS

| GB | 2385450 A | 8/2003 |
| JP | 7078138 | 3/1995 |

(Continued)

OTHER PUBLICATIONS

Digital Library Resources as a Basis for Collaborative Work, Robert Wilensky, Department of EECS, UC Berkeley, Berkeley, CA 94720, JASIS vol. 51, No. 3, Feb. 2000, pp. 1-29.*

(Continued)

Primary Examiner — Stephen S Hong
Assistant Examiner — Ahamed I Nazar

(57) ABSTRACT

A system facilitates the efficient and consistent preparation of comments to documents prepared by others by comparing each such document against phrases and their associated comments stored in one or more local, remote, or removable databases. The system can also facilitate the efficient communication of comments to a given document by organizing such comments in a format suitable for transmission to the intended recipients.

27 Claims, 13 Drawing Sheets

(56) References Cited

U.S. PATENT DOCUMENTS

| | | | |
|---|---|---|---|
| 2002/0129056 A1* | 9/2002 | Conant | G06Q 30/06 715/255 |
| 2002/0143827 A1* | 10/2002 | Crandall | 707/530 |
| 2002/0188630 A1* | 12/2002 | Davis | 707/512 |
| 2003/0004914 A1* | 1/2003 | McGreevy | 707/1 |
| 2003/0018632 A1* | 1/2003 | Bays | G06F 17/241 |
| 2003/0074215 A1* | 4/2003 | Morciniec et al. | 705/1 |
| 2003/0074345 A1* | 4/2003 | Baldwin | G06F 17/218 |
| 2003/0133156 A1* | 7/2003 | Cragun et al. | 358/1.18 |
| 2003/0191770 A1 | 10/2003 | Nudi et al. | |
| 2003/0204490 A1 | 10/2003 | Kasriel | |
| 2003/0214528 A1* | 11/2003 | Pierce et al. | 345/723 |
| 2004/0070614 A1 | 4/2004 | Hoberock | |
| 2004/0098362 A1* | 5/2004 | Gargi | G06F 17/3028 |
| 2004/0163050 A1* | 8/2004 | Matter | 715/530 |
| 2004/0172377 A1 | 9/2004 | Saitou et al. | |
| 2004/0187084 A1* | 9/2004 | Berstis | G06F 17/241 715/259 |
| 2004/0205653 A1* | 10/2004 | Hadfield et al. | 715/530 |
| 2004/0205661 A1 | 10/2004 | Gallemore | |
| 2005/0033736 A1* | 2/2005 | Carlin et al. | 707/3 |
| 2005/0038788 A1* | 2/2005 | Dettinger | G06F 21/6227 |
| 2005/0120294 A1 | 6/2005 | Stefanison et al. | |
| 2005/0132281 A1* | 6/2005 | Pan | G06F 17/241 715/230 |
| 2005/0229156 A1* | 10/2005 | Baumann | 717/110 |
| 2005/0256825 A1* | 11/2005 | Dettinger | G06F 17/3056 |
| 2005/0262051 A1* | 11/2005 | Dettinger | G06F 17/30525 |
| 2006/0129596 A1* | 6/2006 | Bays et al. | 707/102 |
| 2006/0150079 A1 | 7/2006 | Albornoz et al. | |
| 2006/0253449 A1* | 11/2006 | Williamson | G06F 17/24 |
| 2007/0055926 A1* | 3/2007 | Christiansen | G06F 17/241 715/210 |
| 2007/0143663 A1* | 6/2007 | Hansen et al. | 715/512 |
| 2008/0133591 A1* | 6/2008 | Bookman et al. | 707/104.1 |
| 2008/0141117 A1* | 6/2008 | King et al. | 715/238 |

FOREIGN PATENT DOCUMENTS

| | | |
|---|---|---|
| JP | 2006004298 | 1/2006 |
| WO | 01/56388 A2 | 8/2001 |

OTHER PUBLICATIONS

Baldonado et al., "Notable: At the Intersection of Annotations and Handheld Technology", Xerox PARC, 3333 Coyote Hill Road, Palo Alto, CA 94304 USA, P. Thomas and H.-W. Gellersen (Eds.): HUC 2000, LNCS 1927, pp. 100-113, 2000.*

* cited by examiner

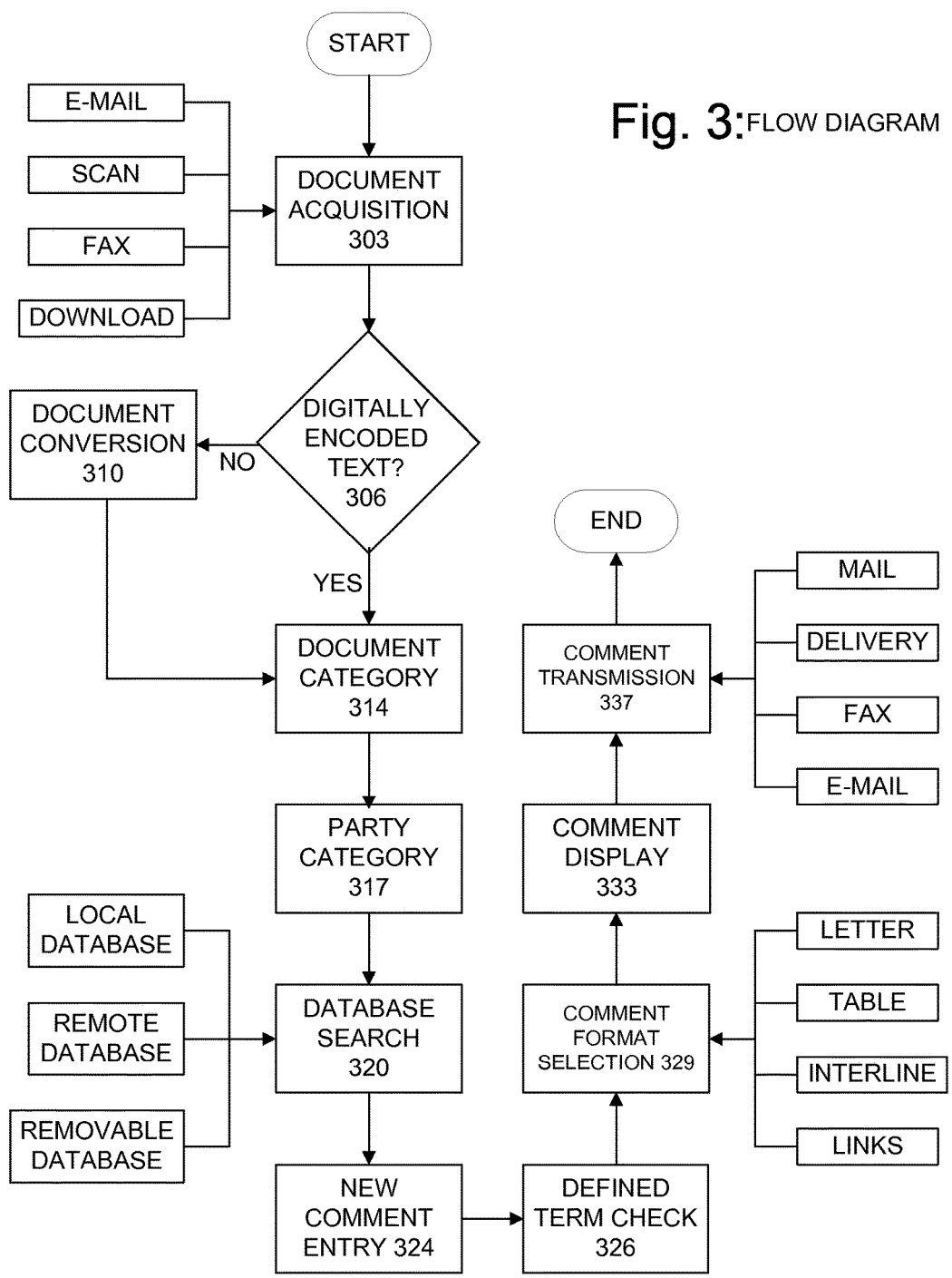
Fig. 3: FLOW DIAGRAM

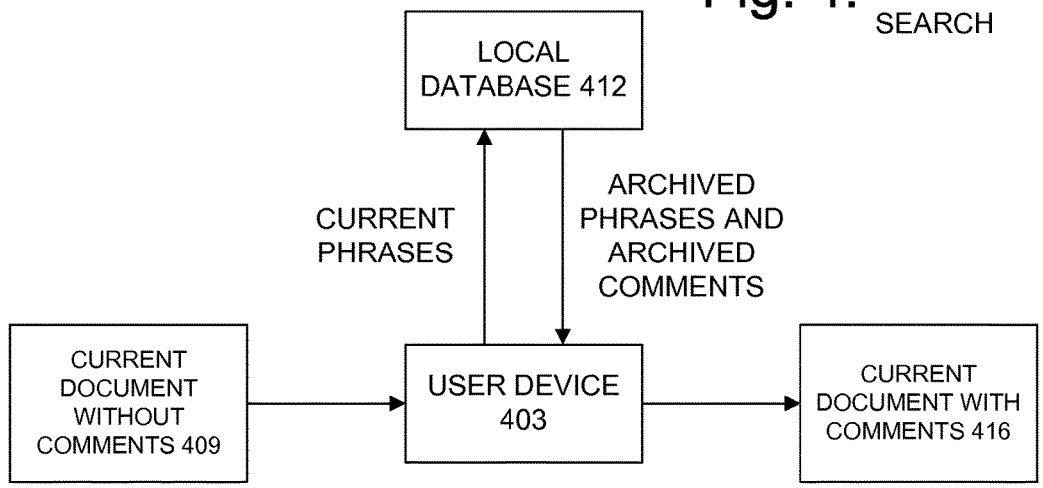
Fig. 4: LOCAL DATABASE SEARCH
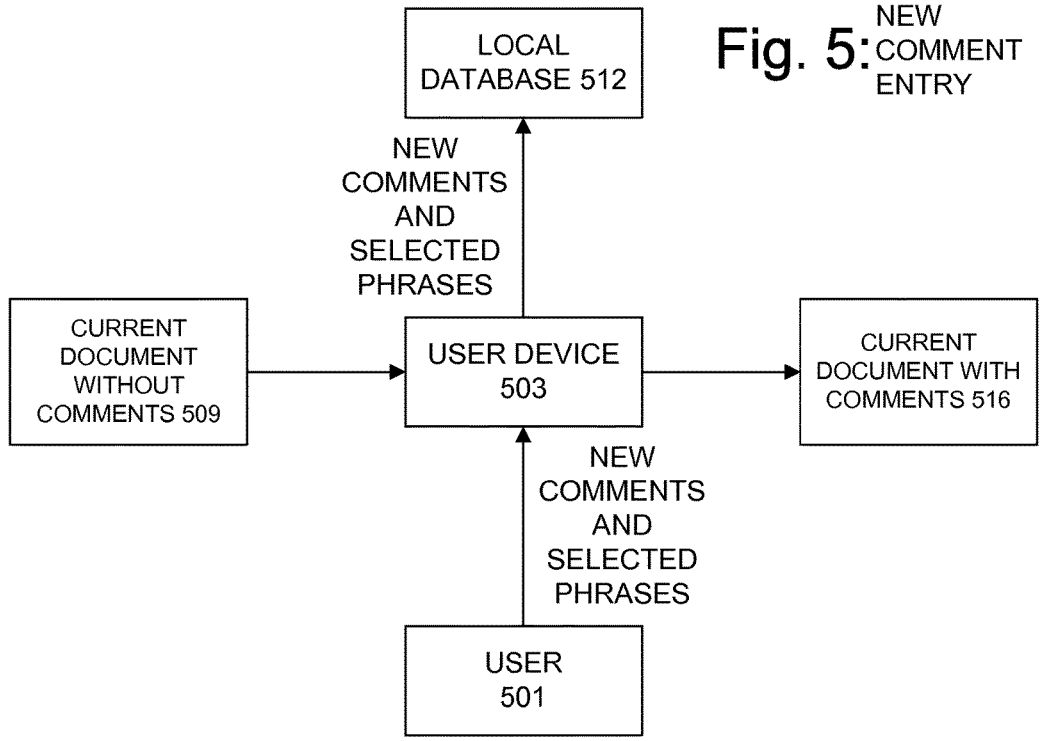
Fig. 5: NEW COMMENT ENTRY

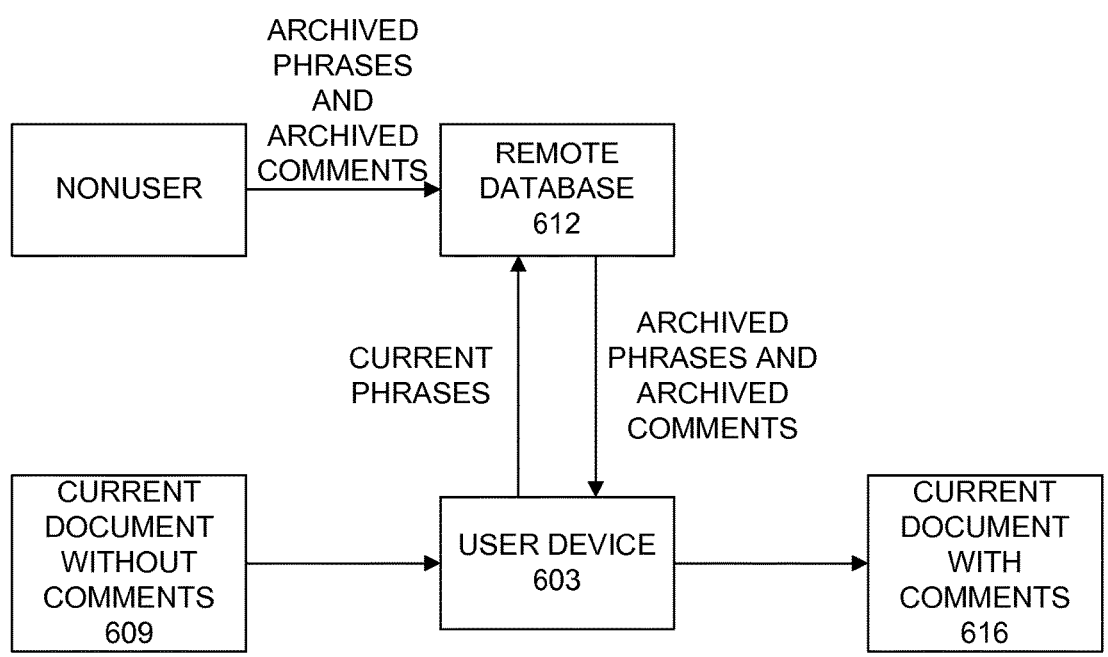
Fig. 6: REMOTE DATABASE SEARCH

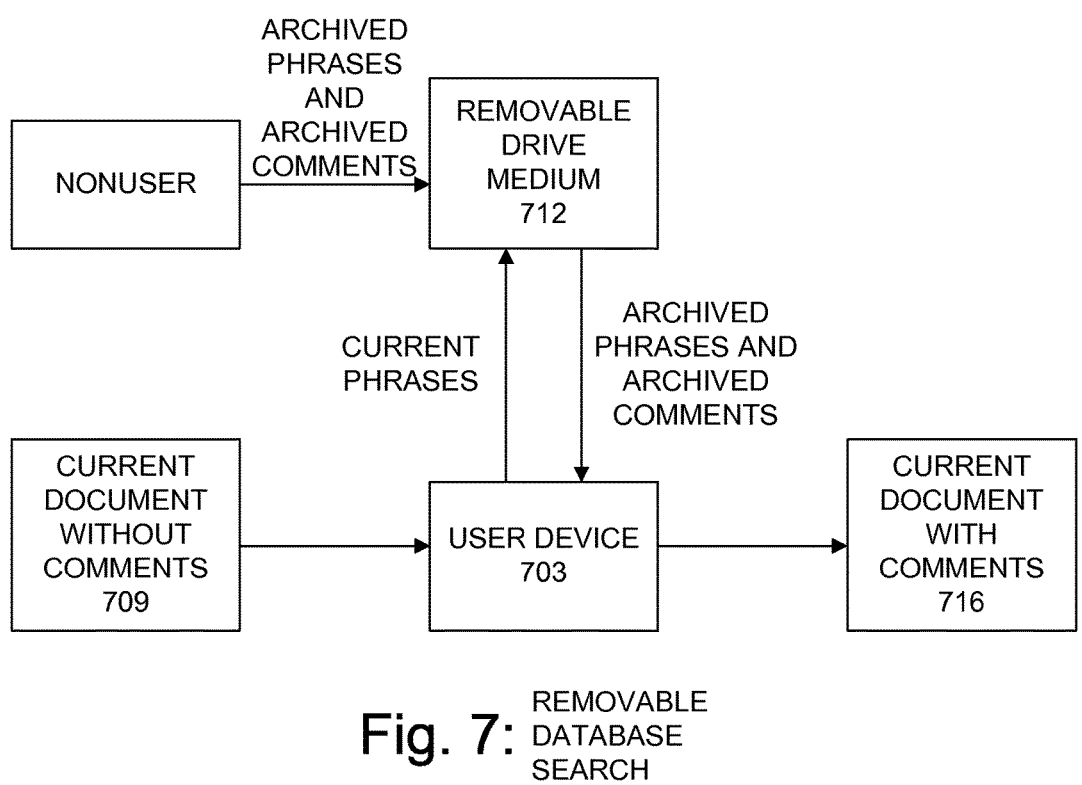
Fig. 7: REMOVABLE DATABASE SEARCH

| FILE | ACQUIRE DOCUMENT | VIEW | FORMAT | SPELL CHECK | Fig. 10 | ABOUT INVENTION |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT is made and entered into April 1, 2006, by and between 123 CORPORATION, whose address is 456 NUMERICAL ROAD, ANYWHERE USA ("Landlord"), and ABC COMPANY, LLC., whose address is ABC ALPHABET WAY, ANYWHERE USA ("Tenant").

ARTICLE I - GRANT OF LEASE

Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of

| FILE | ACQUIRE DOCUMENT | VIEW | FORMAT | SPELL CHECK | Fig. 11 | ABOUT INVENTION |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT is made and entered into April 1, 2006, by and between 123 CORPORATION, whose address is 456 NUMERICAL ROAD, ANYWHERE USA ("Landlord"), and ABC COMPANY, LLC., whose address is ABC ALPHABET WAY, ANYWHERE USA ("Tenant").

ARTICLE I - GRANT OF LEASE

Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

| FILE | ACQUIRE DOCUMENT | VIEW | FORMAT | SPELL CHECK | Fig. 12 | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

CREATE NEW ▲ RCIAL LEASE AGREEMENT

ARCHITECTURAL AG...
THIS LEAS AGENCY AGREEMENT  d entered into April 1, 2006, by and between 123
CORPORAT COMMERCIAL LEAS...  UMERICAL ROAD, ANYWHERE USA ("Landlord"), and
ABC COMP CONTRACTOR'S AG...  s ABC ALPHABET WAY, ANYWHERE USA ("Tenant").
CREDITOR'S AGREE...
ARTICLE I DEVELOPER AGREE... ▼

Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

| FILE | ACQUIRE DOCUMENT | VIEW | FORMAT | SPELL CHECK | Fig. 13 | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

CREATE NEW ▲ SE AGREEMENT

ARCHITECT
THIS LEASE AGREEME AGENCY  April 1, 2006, by and between 123
CORPORATION, whose a LESSEE  ROAD, ANYWHERE USA ("Landlord"), and
ABC COMPANY, LLC., LESSOR  ABET WAY, ANYWHERE USA ("Tenant").
CONTRACTOR
ARTICLE I - GRANT OF CREDITOR ▼

Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

| FILE | ACQUIRE DOCUMENT | VIEW | FORMAT | SPELL CHECK | Fig. 14 | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT is made and entered into April 1, 2006, by and between 123 CORPORATION, whose address is 456 NUMERICAL ROAD, ANYWHERE USA ("Landlord"), and ABC COMPANY, LLC., whose address is ABC ALPHABET WAY, ANYWHERE USA ("Tenant").

ARTICLE I - GRANT OF LEASE

Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

| FILE | ACQUIRE DOCUMENT | VIEW | FORMAT | SPELL CHECK | Fig. 15 | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT is made and entered into April 1, 2006, by and between 123 CORPORATION, whose address is 456 NUMERICAL ROAD, ANYWHERE USA ("Landlord"), and ABC COMPANY, LLC., whose address is ABC ALPHABET WAY, ANYWHERE USA ("Tenant").

ARTICLE I - GRANT OF LEASE

Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

Fig. 16

| FILE | ACQUIRE DOCUMENT | VIEW | FORMAT | SPELL CHECK | | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT CORPORATION, whose add ABC COMPANY, LLC., w

ARTICLE I - GRANT OF L

Landlord, in consideration of observed by the Tenant, does Landlord the property descri "Leased Premises"), together

ARTICLE II - LEASE TERM

Section 1. Total Term of Leas Section 2 of this Article II, ar

Section 2. Commencement D commence to conduct business on the Leased Premises, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

COMMENT LIST

☒ Please provide that Tenant's business shall not be deemed to have commenced unless and until Tenant has commenced production of the first widget.

☐ Please provide that Tenant's business shall not be deemed to have commenced unless and until Tenant received its liquor license.

[Cancel] [Spelling] [Save Local] [Save to Present] [Done]

Fig. 17

| FILE | ACQUIRE DOCUMENT | VIEW | FORMAT | SPELL CHECK | | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT CORPORATION, whose add ABC COMPANY, LLC., w

ARTICLE I - GRANT OF L

Landlord, in consideration of observed by the Tenant, does Landlord the property descri "Leased Premises"), together

ARTICLE II - LEASE TERM

Section 1. Total Term of Leas Section 2 of this Article II, ar

Section 2. Commencement D commence to conduct business on the Leased Premises, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

COMMENT LIST

☒ Please change "60 days" to "180 days."

[Cancel] [Spelling] [Save Local] [Save to Present] [Done]

| FILE | ACQUIRE DOCUMENT | VIEW | FORMAT | SPELL CHECK | Fig. 18 | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT is made and entered into April 1, 2006, by and between 123 CORPORATION, whose address is 456 NUMERICAL ROAD, ANYWHERE USA ("Landlord"), and ABC COMPANY, LLC whose address is ABC ALPHABET WAY, ANYWHERE USA ("Tenant").

ARTICLE I - GRANT OF LEASE

Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

| FILE | ACQUIRE DOCUMENT | VIEW | FORMAT | SPELL CHECK | Fig. 19 | HELP |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMENT is made and entered into April 1, 2006, by and between 123 CORPORATION, whose address is 456 NUMERICAL ROAD, ANYWHERE USA ("Landlord"), and ABC COMPANY, LLC whose address is ABC ALPHABET WAY, ANYWHERE USA ("Tenant").

ARTICLE I - GRANT OF LEASE

COMMENT LIST

Please change "ABC COMPANY, LLC" to "ABC COMPANY, INC."

| Cancel | Spelling | Save Local | Save to Present | Add New | Done |

Fig. 20

| FILE | ACQUIRE DOCUMENT | VIEW | FORMAT | SPELL CHECK | | ABOUT INVENTION |
|---|---|---|---|---|---|---|
| CONVERT DOCUMENT | DOCUMENT CATEGORY | PARTY CATEGORY | DATABASE QUERY | TERM CHECK | | TRANSMIT COMMENTS |

COMMERCIAL LEASE AGREEMENT

THIS LEASE AGREEMEN~~T~~ ), and
CORPORATION, whose ad ~~ant"~~).
ABC COMPANY, LLC.,

ARTICLE I - GRANT OF L

Landlord, in consideration o ed and
observed by the Tenant, doe e from the
Landlord the property descri of (the
"Leased Premises"), togethe

ARTICLE II - LEASE TER

Section 1. Total Term of Lea defined in
Section 2 of this Article II,

Section 2. Commencement enant shall
commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

TERM CHECK

| DEFINED TERM | REPLACEMENT |
|---|---|
| Tenant | |
| Landlord | |
| Term | |
| Rent | |

[ Cancel ] [ Spelling ] [ Save Local ] [ Save to Present ] [ Done ]

Fig. 21

| FILE | | FORMAT | SPELL CHECK | WINDOW | HELP | ABOUT INVENTION |
|---|---|---|---|---|---|---|
| CONVERT DOCUMENT | | DATABASE QUERY | TERM CHECK | COMMENT FORMAT | DISPLAY COMMENTS | TRANSMIT COMMENTS |

COMMERCIAL LEASE AGREE~~MENT~~

THIS LEASE AGREEMENT is made and entered into April 1, 2006
whose address is 456 NUMERICAL ROAD, ANYWHERE USA ("L~~andlord~~
LLC, whose address is ABC ALPHABET WAY, ANYWHERE US

ARTICLE I - GRANT OF LEASE

Comment Format menu:
- COMMENT LETTER
- COMMENT TABLE
- INTERLINEATED DOC
- DOC WITH LINKS Landlord, in consideration of the rents to be paid and the covenants and agreements to be performed and observed by the Tenant, does hereby lease to the Tenant and the Tenant does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premised, so long as such date is not in excess of sixty (60) days subsequent to execution hereof.

ARTICLE III - EXTENSIONS The parties hereto may elect to extend this Agreement upon such terms and conditions as may be agreed upon in writing and signed by the parties at the time of any

Fig. 22

| FILE | FORMAT | SPELL CHECK | WINDOW | HELP | ABOUT INVENTION |
|---|---|---|---|---|---|
| CONVERT DOCUMENT | DATABASE QUERY | TERM CHECK | COMMENT FORMAT | DISPLAY COMMENTS | TRANSMIT COMMENTS |

COMMERCIAL LEASE AGREEMENT

Please change "ABC COMPANY, LLC" to "ABC COMPANY, INC."

THIS LEASE AGREEMENT is made and entered into April 1, 2006, by and between 123 CORPORATION, whose address is 456 NUMERICAL ROAD, ANYWHERE USA ("Landlord"), and ABC COMPANY, LLC, whose address is ABC ALPHABET WAY, ANYWHERE USA ("Tenant").

ARTICLE I - GRANT OF LEASE

Please provide that Tenant's business shall not be deemed to have commenced unless and until Tenant has commenced production of the first widget.

Landlord, in consideration of the rents to be paid and the covenants and agreements to be performed and observed by the Tenant, does hereby lease to the Tenant, and the Tenant, does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premises, so long as such date is not in excess of sixty (60) days subsequent to execution hereof.

Please change "60 days" to "90 days."

ARTICLE III - EXTENSIONS The parties hereto may elect to extend this Agreement upon such terms and conditions as may be agreed upon in writing and signed by the parties at the time of

| FILE | FORMAT | SPELL CHECK | WINDOW | HELP | ABOUT INVENTION |
|---|---|---|---|---|---|
| CONVERT DOCUMENT | DATABASE QUERY | TERM CHECK | COMMENT FORMAT | DISPLAY COMMENTS | TRANSMIT COMMENTS |

Submenu under TRANSMIT COMMENTS:
- PRINT
- SEND VIA FAX
- SEND AS E-MAIL
- POST TO WEB PAGE

COMMERCIAL LEASE AGREEMENT

Please change "ABC COMPANY, LLC" to "ABC COMPANY, INC."

THIS LEASE AGREEMENT is made and entered into April 1, 2006, by and between 123 CORPORATION, whose address is 456 NUMERICAL ROAD, ANYWHERE USA and ABC COMPANY, LLC, whose address is ABC ALPHABET WAY, ANYWHE ("Tenant").

ARTICLE I - GRANT OF LEASE

Please provide that Tenant's business shall not be deemed to have commenced unless and until Tenant has commenced production of the first widget.

Landlord, in consideration of the rents to be paid and the covenants and agreements to be performed and observed by the Tenant, does hereby lease to the Tenant, and the Tenant, does hereby lease and take from the Landlord the property described in Exhibit "A" attached hereto and by reference made a part hereof (the "Leased Premises"), together with, as part of the parcel, all improvements located thereon.

ARTICLE II - LEASE TERM

Section 1. Total Term of Lease. The term of this Lease shall begin on the commencement date, as defined in Section 2 of this Article II, and shall terminate on March 31, 2016.

Section 2. Commencement Date. The "Commencement Date" shall mean the date on which the Tenant shall commence to conduct business on the Leased Premises, so long as such date is not in excess of sixty (60) days subsequent to execution hereof.

Please change "60 days" to "180 days."

ARTICLE III - EXTENSIONS The parties hereto may elect to extend this Agreement upon such terms and conditions as may be agreed upon in writing and signed by the parties at the time of

SMART COMMENTING SOFTWARE

CROSS-REFERENCE TO RELATED APPLICATION

This patent application is claims the benefit of U.S. provisional patent application 60/744,915, filed Apr. 14, 2006, which is incorporated by reference along with all other references cited in this application.

BACKGROUND OF THE INVENTION

This invention relates to computer application software and more specifically to document commenting software.

Lawyers, bankers, accountants, agents, brokers, programmers, and others spend much of their time preparing comments to various documents. A lawyer representing a commercial tenant, for example, might receive a commercial lease agreement from the landlord, prepare comments to the lease provisions, communicate those comments to the landlord, and ask that the lease be modified to conform to those comments. These documents typically include the same or similar provisions, so the comments to these provisions are generally the same or similar as well. A commercial lease, for example, typically includes similar provisions governing the term, computation and payment of rent, security deposits, prohibited uses, subleasing, repairs, alterations, property taxes, insurance, utilities, signs, landlord entry, parking, tenant damage, default, condemnation, subordination, notices, brokers, and notices. As a result, a lawyer is likely to encounter the same or similar provisions, and prepare the same or similar comments, each and every time he or she represents a tenant in connection with a commercial lease negotiation.

Preparing the same or similar comments to the same or similar provisions is inefficient, costly, time consuming, tedious, and unenjoyable. In addition, due to the quantity of different comments to complex documents, many comments are often overlooked. Finally, members of the same company often make different comments to the same documents, so the company takes conflicting positions on the same issues, resulting in confusion both in the marketplace and within the company and signaling to those outside the company that the company is not well organized and its members not well coordinated.

Existing commercial programs have only relatively rudimentary commenting features—allowing a user to insert new comments manually into an existing document. Some examples of existing applications include Adobe Acrobat 7.0 Professional from Adobe Systems Incorporated (San Jose, Calif., USA), Microsoft Word 2003 and Excel 2003 from Microsoft Corporation (Redmond, Calif., USA), and WordPerfect 10 from Corel Corporation (Ottawa, Ontario, Canada) which allow a user to insert comments manually into a document, file, or other. Further, some programs also allow multiple collaborators to insert comments into the same document in such a way that comments made by one person are distinguishable from comments made by another person, and also the identity of a person making a particular comment may be made known to others.

Despite the success of these applications, there is a need for improved commenting software. The prior art does not provide features such as automatically generating comments to documents prepared by other parties based on comments prepared by others and stored on a remote database or comments prepared by the user and others sharing a local database and stored on that database. There is a need for such an invention.

BRIEF SUMMARY OF THE INVENTION

A system facilitates the efficient and consistent preparation of comments to documents prepared by others by comparing each such document against phrases and their associated comments stored in one or more local, remote, or removable databases. The system can also facilitate the efficient communication of comments to a given document by organizing such comments in a format suitable for transmission to the intended recipients. In an implementation, the system provides automatic generation of comments for a document based on comments previously prepared.

Features of the system include: (1) "learning" comments by storing them in a database whenever made anew; (2) storing comments in a database by associating them with the phrases to which they were made; (3) retrieving comments from the database by using the phrases of a new documents as search terms and returning the comments associated with those phrases; (4) permitting the user to supplement, delete, or edit the comments so retrieved; and (5) placing the final comments in one of several formats (e.g., chart, comment letter, or marginal notations) for transmission to another party (which may be an opposing party).

In a specific implementation, the invention is a method including: retrieving a document; selecting a document category for the document; selecting a party category for the document; searching a database for comments for the document, pertinent to the document category and party category; and providing a list of comment results from searching the database.

The document category may be at least one of a first type of document or a second type of document. When the document category is the first type of document, the list of comment results includes comments not found when the document category is the second type of document. The party category may be at least one of a first type of party or a second type of party. When the party category is the first type of party, the list of comment results includes comments not found when the party category is the second type of party.

The list of comments may be provided in a chart format. The list of comments may be provided using marginal notations. The database may be a remote database, accessible through a network by more than one user. This provides for workgroup collaboration. The database maybe contained on a removable drive medium. This may be useful for mobile users or for improved security in some instances.

The may further include: adding a new comment into the document; and adding the new comment into the database. Using such an approach, the database may be supplemented or updated with new information.

In a specific implementation, the invention is a method including: retrieving a first document; adding a first comment to the first document; adding the first comment to a comments database; subsequent to adding the first comment, retrieving a second document; searching the comments database; and providing a list of comment results from searching the comments database, where the comment results include the first comment.

The first document may be retrieved on a first device by a first user and the second document is retrieved on a second device by a second user. The second device is different from the first device and the second user is different from the first user.

The first comment may be stored in the comments database associated with a first phrase for which the first comment was made. The second document may include the first phrase. The first comment may be associated with an associated group of words in the first document. When the associated group of words is not in the comments database, the first comment is a new comment. When the associated group of words is in the comments database, the first comment is an additional comment for the first associated group of words.

The comments database may be accessed through the Internet. This may allow users to remotely access the database. Also, the application may be an on-line application, so the user perhaps may be running an application of the invention using a web browser, terminal client, or similar application software. The application may be executing on a portable device.

The method may include: adding a second comment to the second document associated with the same phrase as the first comment for the first document; and adding the second comment to the comments database, where the first and second comments are associated with the same phrase.

In a specific implementation, the invention is a system including: computer-executable code to search a document to find a listing of comments and phrases associates with the comments; computer-executable code to determine whether each comment and associated phrase found is in a comments database; and computer-executable code to add a comment and associated phrase to the comments database if the comment and associated phrase is not found.

The system may include: computer-executable code to retrieve a document; computer-executable code to search the comments database and find comments for phrases in the document that are also in the comments database and inserting the found comments into the document; and computer-executable code to provide a user an option of displaying the found comments in at least one of an inline display of comments or a table of comments.

The system may include: computer-executable code to provide the user a capability to add a new comment to the document; computer-executable code to provide the user with an option to add the new comment to the comments database. The system may include computer-executable code to provide a user a listing of document categories for which the user may select for the document. The system of claim may include computer-executable code to provide a user a listing of party categories for which the user may select for the document.

In various specific embodiments, the invention is: A system for facilitating the production by a user of comments to a document including: means for storing in a database at least one phrase and at least one comment associated with the at least one phrase; means for searching the database for at least one phrase that is similar to at least one phrase of the document; and means for retrieving from the database the at least one comment associated with the at least one phrase similar to the at least one phrase of the document.

A system for facilitating the production by a user of comments to a document including: means for storing in a database at least one phrase and at least one comment associated with the at least one phrase, where the database can be searched for at least one phrase that is similar to at least one phrase of the document; and the at least one comment associated with the at least one phrase similar to the at least one phrase of the document can be retrieved from the database.

A system for facilitating the production by a user of comments to a document including: means for searching a database for at least one phrase that is similar to at least one phrase of the document, where the database contains at least one phrase and at least one comment associated with the at least one phrase; and the at least one comment associated with the at least one phrase similar to the at least one phrase of the document can be retrieved from the database.

A system for facilitating the production by a user of comments to a document including: means for retrieving from the database at least one comment associated with at least one phrase similar to at least one phrase of the document, where the database contains at least one phrase and at least one comment associated with the at least one phrase; and the database can be searched for at least one phrase that is similar to at least one phrase of the document.

A system for facilitating the production by a user of comments to a document including: means for storing in a database at least one phrase and at least one comment associated with the at least one phrase; means for searching the document for at least one phrase that is similar to at least one phrase of the database; and means for retrieving from the database the at least one comment associated with the at least one phrase similar to the at least one phrase of the document.

A system for facilitating the production by a user of comments to a document including: means for storing in a database at least one phrase and at least one comment associated with the at least one phrase, where the document can be searched for at least one phrase that is similar to at least one phrase of the database; and the at least one comment associated with the at least one phrase similar to the at least one phrase of the document can be retrieved from the database.

A system for facilitating the production by a user of comments to a document including: means for searching a document for at least one phrase that is similar to at least one phrase of the database, where the database contains at least one phrase and at least one comment associated with the at least one phrase; and the at least one comment associated with the at least one phrase similar to the at least one phrase of the document can be retrieved from the database.

A system for facilitating the production by a user of comments to a document, including: means for retrieving from the database at least one comment associated with at least one phrase similar to at least one phrase of the document, where the database contains at least one phrase and at least one comment associated with the at least one phrase; and the document can be searched for at least one phrase that is similar to at least one phrase of the database.

A system for facilitating the production by a user of comments to a document including: means for storing in a database at least one comment; means for searching the database for at least one comment that is similar to at least one phrase of the document; and means for retrieving from the database the at least one comment similar to the at least one phrase of the document.

A system for facilitating the production by a user of comments to a document including: means for storing in a database at least one comment, where the database can be searched for at least one comment that is similar to at least one phrase of the document; and the at least one comment similar to the at least one phrase of the document can be retrieved from the database.

A system for facilitating the production by a user of comments to a document including: means for searching a database for at least one comment that is similar to at least one phrase of the document, where the database contains at least one comment; and the at least one comment similar to the at least one phrase of the document can be retrieved from the database.

A system for facilitating the production by a user of comments to a document including: means for retrieving from the database at least one comment that is similar to at least one phrase of the document, where the database contains at least one comment; and the database can be searched for at least one comment that is similar to at least one phrase of the document.

A system for facilitating the production by a user of comments to a document including: means for storing in a database at least one comment; means for searching the document for at least one phrase that is similar to the at least one comment in the database; and means for retrieving from the database the at least one comment similar to the at least one phrase of the document.

A system for facilitating the production by a user of comments to a document, including: means for storing in a database at least one comment, where the document can be searched for at least one phrase that is similar to the at least one comment in the document; and the at least one comment similar to the at least one phrase of the document can be retrieved from the database.

A system for facilitating the production by a user of comments to a document including: means for searching the document for at least one phrase that is similar to at least one comment in the database, where the database contains at least one comment; and the at least one comment similar to the at least one phrase of the document can be retrieved from the database.

A system for facilitating the production by a user of comments to a document including: means for retrieving from the database at least one comment that is similar to at least one phrase of the document, where the database contains at least one comment; and the document can be searched for at least one phrase that is similar to at least one comment in the database.

In the above specific embodiments, the document may be prepared by someone other than the user. The document may be prepared by someone who does not have access to the database. At least one of the comments in the database may be prepared by someone other than the user. At least one of the comments in the database may be prepared by someone who does not have access to the database. At least one of the comments in the database may be prepared by the user. At least one of the comments in the database may be prepared by someone who has access to the database. The database may reside on the user device. The database may reside on a server to which the user device has access. The server may be accessed over a local area network (LAN). The server may be accessed over a communications network. The communications network may be at least one of cable, satellite, telephone lines, cellular, microwave, radio, light, or laser. The database may reside on at least one of a diskette, CD-ROM, DVD, memory stick, or removable drive medium.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 is a flow diagram of an embodiment of the present invention.
FIG. 4 is a flow diagram of an embodiment of a Local Database search for Archived Comments.
FIG. 5 is a flow diagram of an embodiment of the identification of Selected Phrases and the entry of New Comments.
FIG. 6 is a flow diagram of an embodiment of a Remote Database search.
FIG. 7 is a flow diagram of an embodiment of a Removable Database search.
FIG. 10 shows acquiring a document from a scanner.
FIG. 11 shows converting the scanned document to text.
FIG. 12 shows selecting a document category for the document.
FIG. 13 shows creating a party category for the document.
FIG. 14 shows selecting a database query.
FIG. 15 shows highlighting of words or phrases in the document for making a new comment entry.
FIG. 16 shows a pop-up window with a comment list and comment for an accompanying phrase in the main document screen highlighted.
FIG. 17 shows a pop-up window with a comment in the comment list for another phrase in the main document screen highlighted.
FIG. 18 shows a defined term check and accompanying pop-up window.
FIG. 19 shows a comment list popping up as a result of the selected words.
FIG. 20 shows selecting a term check menu option and an accompanying term check pop-up window.
FIG. 21 shows a comment format menu option and selected having comment interlineated in the document.
FIG. 22 shows a display comments menu option and comments being show on the left-hand side of the document window.
FIG. 23 shows a transmit comments menu option and selecting sending by e-mail of the document with comments.

DETAILED DESCRIPTION OF THE INVENTION

The present invention facilitates the efficient and consistent preparation of comments to documents prepared by others by comparing each provision of each such document against provisions and their associated comments stored in one or more Databases. Databases might be Local Databases, Remote Databases, and/or Removable Databases. Local Databases might be located on the user's own hard drive or on the hard drive of a Local Area Network (LAN) server to which the user is connected. Local Databases might include comments prepared by the user or those sharing the LAN server (such as lawyers in the same law firm) during previous document commenting sessions, together with the phrases to which those comments were made. Remote Databases might be located on a remote server, accessible over the Internet or some other communications network. They might include generic comments prepared by others and the provisions to which such comments are typically made. Removable Databases might include CD-ROMs, DVDs, or other removable drive media embodying the same content stored on a remote database. In an embodiment, the present invention might also facilitate the efficient communication of comments to a given document by organizing such comments in a format suitable for transmission to the intended recipients.

Figure 1:
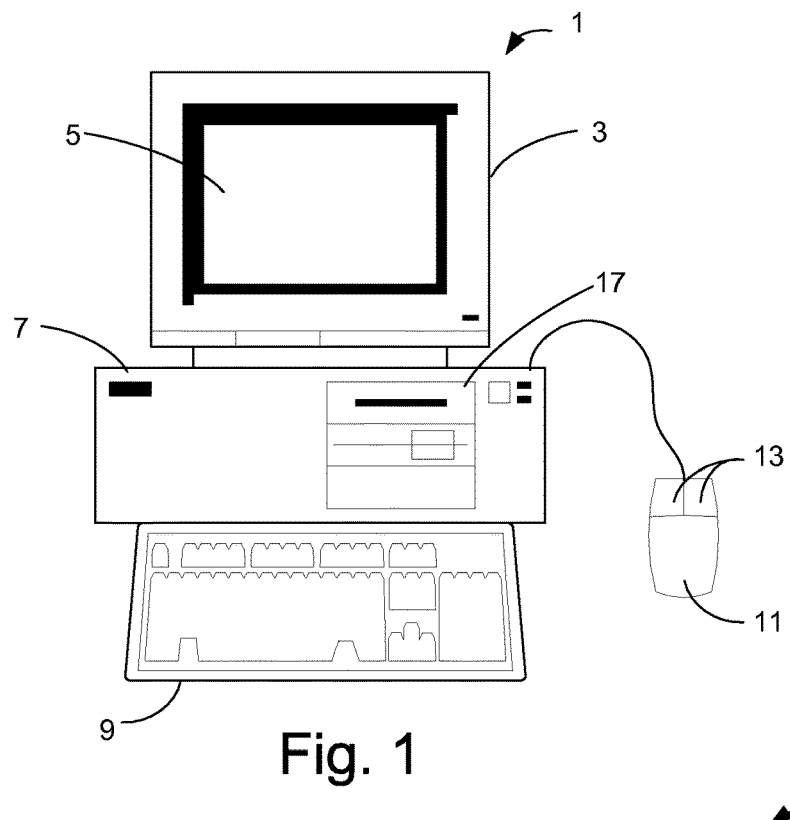
FIG. 1 shows a system of the present invention.

In an embodiment, the present invention includes a Program installed on a conventional computer, which includes a keyboard, mouse, monitor, scanner, and printer. FIG. 1 shows a specific embodiment of a system of the present invention. In an embodiment, the invention includes software that executes on a computer workstation system, such as shown in FIG. 1. FIG. 1 shows a computer system 1 that includes a monitor 3, screen 5, cabinet 7, keyboard 9, and mouse 11. Mouse 11 may have one or more buttons such as mouse buttons 13. Cabinet 7 houses familiar computer components, some of which are not shown, such as a processor, memory, mass storage devices 17, and the like.

Examples of mass storage devices 17 include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
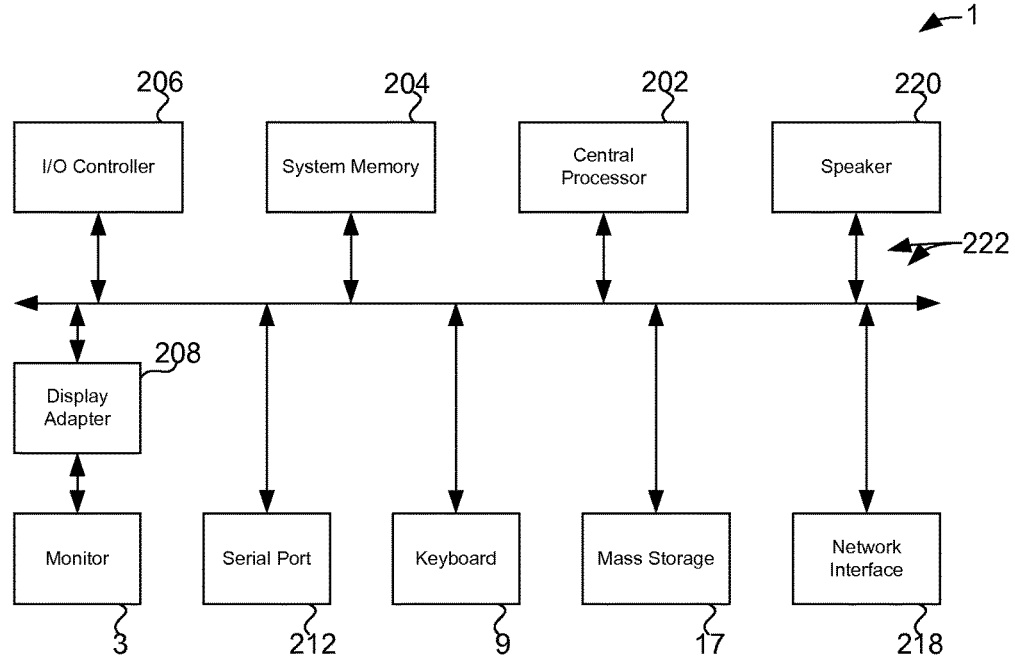
FIG. 2 shows a simplified system block diagram of a computer system used to execute software of the invention.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems.

For example, a computer system could include more than one processor 202 (i.e., a multiprocessor system) or the system may include a cache memory. The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper, aluminum, gold, or other metal or conductor), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In a specific embodiment of the invention, the program proceeds through several distinct steps presented. It should be understood, however, that the invention is not limited to the specific flow and steps presented. A flow of the invention may have additional steps (not necessarily described in this application), different steps which replace some of the steps presented, fewer steps or a subset of the steps presented, or steps in a different order than presented, or any combination of these. Further, one or more steps may be combined with one or more other steps.

In an embodiment, the present invention includes a computer program (the "Program"), installed on a conventional computer, which includes a keyboard, mouse, monitor, scanner, and printer. The Program guides the user through the following steps:

1. Document Acquisition: Acquiring a document prepared by another (the "Current Document") by e-mail attachment, scanner, facsimile, website file download, or other means including those known to those of ordinary skill in the art.

2. Document Conversion: If necessary, converting of the Current Document into a digitally encoded text format by optical character recognition (OCR) or other means including known to those of ordinary skill in the art.

3. Document Category: Identifying a category (the "Document Category") of the Current Document to be reviewed.

4. Party Category: Identifying the category (the "Party Category") of the party on whose behalf the Current Document is being reviewed.

5. Database Search: Searching the Databases for words or phrases ("Archived Phrases") that are the same as or similar to words or phrases ("Current Phrases") appearing in the Current Document, retrieving those comments ("Archived Comments") associated with each Archived Phrase returned by the search, and displaying the Archived Comments in order of relevance.

6. New Comment Entry and Database Building: Highlighting or otherwise identifying Current Phrases ("Selected Phrases") for the entry of new comments ("New Comments"), and entering the New Comments into a text dialog box (which Selected Phrases and New Comments are added to Local Databases to serve as Archived Comments to future documents).

7. Defined Term Check: Checking the Archived Comments and the New Comments (collectively, "Comments") for capitalized and other terms ("Defined Terms") that may have been utilized in a manner specific to the Current Document.

8. Comment Format Selection: Selecting a format (the "Commenting Format") for the presentation of the Comments to the intended recipients, which Commenting Format might include a formal comment letter, comment table, interlineated version, or website link.

9. Comment Display: Displaying the Comments in the Commenting Format for user review and approval.

10. Comment Transmission: Transmitting the Comments in the Commenting Format to the intended recipients, which transmission might be accomplished by conventional mail, personal delivery, facsimile, or e-mail.

Greater detail of a system of the invention is discussed below. Except as otherwise indicated, the capitalized terms appearing below relate to corresponding terms set forth above. In a specific implementation, the invention is application software. This software may be provided as a standalone application program that is executable on a computer. In other implementations, aspects of the invention may be incorporated in other applications, such as word processing, spreadsheet, or portable document format viewers. For example, basic commenting features may already be provided by a particular application. More advanced commenting features of the invention, as discussed in this application, may be incorporated into any word processing program or other base program by using a plug-in or using a separate application that works in conjunction with base program.

In further implementations, software or aspects of the invention may be provided as an on-line or web-based application. Such an application may be written using Java, AJAX, or other similar language. Aspects of the invention may be applied to web-based tools such as blogs, on-line word processors, web site development tools, HTML editors, XML editors, and many more.

Figure 8:
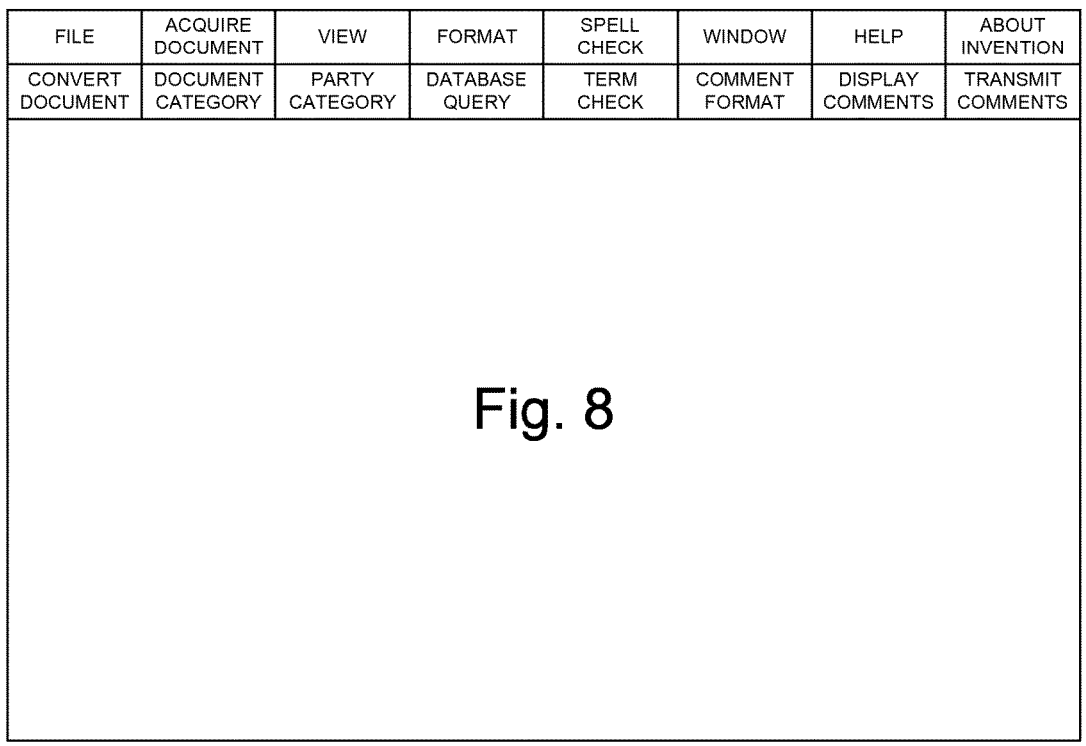
FIG. 8 shows a user screen of an application program for working on documents.

FIG. 3 shows a flow of diagram for a specific embodiment of the invention. FIGS. 8-23 show sample user screens. FIG. 8 shows a user screen of an application program for working on documents. The application includes menu options: file, acquire document, view, format, spell check, window, help, about invention, convert document, party category, database query, term check, comment format, display comments, and transmit comments. Below the menu bar is a window which may be used to display a document.

Step One: Document Acquisition

Figure 9:
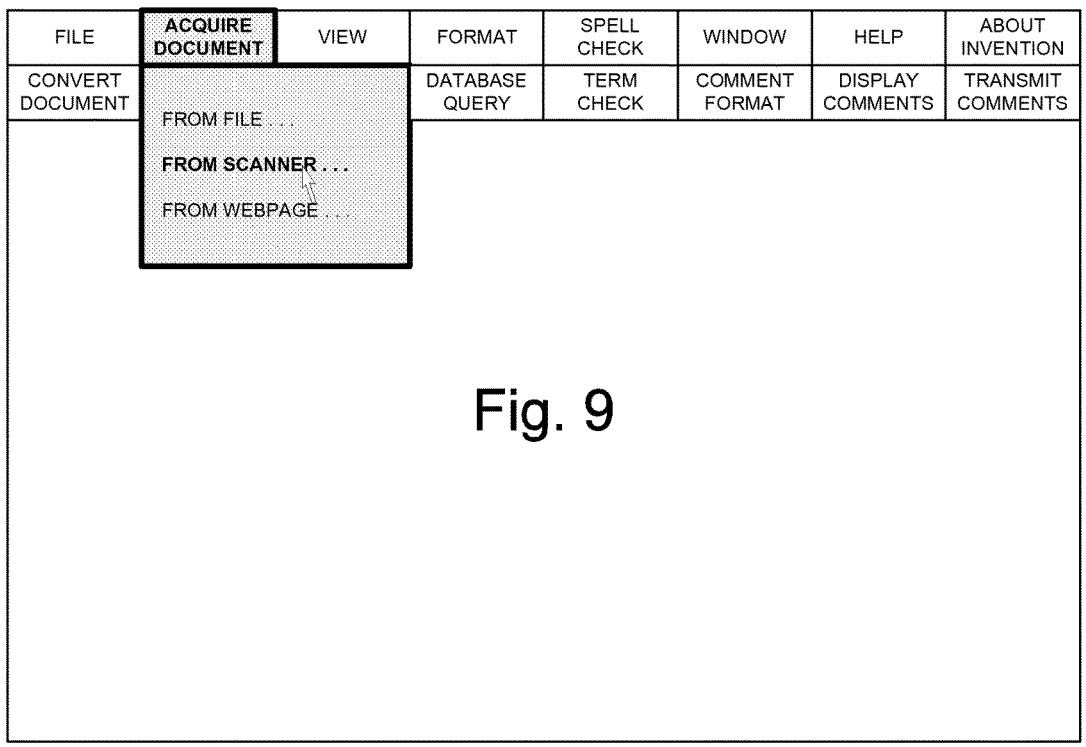
FIG. 9 shows selecting "acquire document" from a menu and "from scanner" from a submenu.

Step One (step 303) concerns the acquisition of the Current Document. Document acquisition can be accomplished by any number or means, depending upon the form in which the Current Document is initially received by the user. A document may be acquired, for example, from e-mail, scan, fax, or download. FIG. 9 shows a user screen for selecting "acquire document" from a menu and "from scanner" from a submenu. FIG. 10 shows a user screen for acquiring a document from a scanner. The document window shows the scanned document. Note that often scanned documents include artifacts that are introduced by the scanning process (as is shown in the figure).

For example, Current Documents in the form of printed text on paper might by acquired by optically scanning the Current Document into the Program. Scanning is one means of acquiring printed paper documents and known to those of ordinary skill in the art. See, e.g., the Create PDF feature in Adobe Acrobat 7.0 Professional from Adobe Systems Incorporated (San Jose, Calif.). Once the document is scanned, it must be saved into any one of a number of possible graphic file formats. Examples of graphic files include Portable Document Format (PDF) from Adobe Systems Incorporated, Joint Photographic Experts Group (JPEG) format from International Organization for Standardization (Geneva, Switzerland) and ITU Telecommunication Standardization Sector (Geneva, Switzerland), or the Tag Image File Format (TIFF) from Adobe Developer Association (Mountain View, Calif.).

Alternatively, the user might acquire the Current Document via facsimile transmission from another party directly to the user's computer or server. This can be accomplished by using any one of a number of facsimile transmission software programs, such as WinFax PRO 10.0 from Symantec Corporation (Cupertino, Calif.). Such transmissions are typically received in a graphic image format, such as those described above.

Current Documents might also be acquired as e-mail attachments or as file downloads from websites or bulletin board systems. Saving attachments and downloads to a user device is a common means of acquiring files and known to those of ordinary skill in the art. See, e.g., the Save Attachments feature in Microsoft Outlook 2002 from Microsoft Corporation (Redmond, Wash.) and the Save a Copy feature in Adobe Reader 7.0 from Adobe Systems Incorporated. Current Documents acquired as file attachments or downloads may be in graphic image formats (as described above) or digitally encoded text formats, such as Word 2003 or Excel 2003 from by Microsoft Corporation, WordPerfect 10 from Corel Corporation (Ottawa, Ontario, Canada), American Standard Code for Information Interchange (ASCII) from the American Standards Association.

Step Two: Document Conversion

In a step 306, in order for the Program to associate comments with the text of the Current Documents, such text should be in a digitally encoded text format (such as those described in Step One above). If a Current Document is acquired in a digitally encoded text format, then no document conversion is required. But if the Current Document is acquired in a graphic image format, it may be converted (step 310) into a digitally encoded text format. FIG. 11 shows a user screen for converting the scanned document to text. A common means of converting a graphical image format into a digitally encoded text format is optical character recognition (OCR).

OCR conversion programs are commercially available and known to those of ordinary skill in the art. See, e.g., ScanSoft OmniPage 15 from Nuance Communications, Inc. (Burlington, Mass.) and IRIS ReadIris Pro 10 from I.R.I.S. (Louvain-la-Neuve, Belgium). OCR is also included in many document management programs. See, e.g., the Recognize Text Using OCR feature in Adobe Acrobat 7.0 Professional. Conversion can also be accomplished by other means, such as manually typing the text of a document into a digitally encoded text format.

Step Three: Document Category

In a step 314, the user is prompted to identify the Document Category of the Current Document. FIG. 12 shows a user screen for selecting a document category for the document. The specific Document Categories available will vary and may depend on the type of document, business or profession, or other factors. Document Categories for lawyers, for example, might include Employment Agreement, Residential Purchase and Sale Agreement, Settlement Agreement, or Software License Agreement. Document Categories for bankers and accountants might include Principal Terms of Sale, Profit and Loss Statement, Income Projections, or Merger Closing Agenda. Different people (such as including people in different professions, e.g., lawyers, doctors, firemen, civil servant, accountants) will have different categories of document applicable to them.

By way of illustration, let us assume that the Current Document is a commercial lease agreement. The program displays a dialog box and prompts the user to identify a Document Category for the Current Document. The dialog box includes a list of all Document Categories ("Archived Document Categories") previously created during previous sessions by users of the same database (whether on a single computer or server or on a network of computers or servers) (the "Database"). The dialog box also includes a blank text box into which the user can enter a new Document Category ("New Document Category") for the Current Document. Let us assume that there is no Archived Document Category for Commercial Lease Agreement. The user enters Commercial Lease Agreement in the blank text box and saves the entry to the Database.

In another embodiment of the invention, the user can use the right key of the mouse to click on an Archived Document Category to delete or amend it. If, for example, an Archived Document Category exists for Lease Agreement, but the documents previously reviewed under that category were only residential lease agreements, the user might want to create a New Document Category entitled Commercial Lease Agreement and rename the Archived Document Category Residential Lease Agreement. The use of the right mouse key in this manner is a common feature of popular operating systems and known to those of ordinary skill in the art. See, e.g., the Windows Explorer file manager found in the Windows 95/98/XP operating systems from Microsoft Corporation.

In yet another embodiment, the user might wish to arrange the Archived Document Categories and New Document Categories in a tree format, where a parent category is entitled Lease Agreement, and two subcategories are entitled Residential Lease Agreement and Commercial Lease Agreement. Tree formats could be created by clicking on a parent Document Category with the right mouse key, selecting New Category, and entering the name of each subordinate Document Category. Tree formats could also be created by dragging-and-dropping a Document Category into another Document Category. The foregoing tree format and right-key mouse function are common features of popular operating systems and known to those of ordinary skill in the art. See, e.g., the Windows Explorer file manager found in the Windows 95/98/XP operating systems from Microsoft Corporation.

Step Four: Party Category

In a step 317, the Program prompts the user to identify the Party Category for the Current Document. FIG. 13 shows a user screen for creating a party category for the document. Party Categories will vary and may depend on the Document Category, the type of document, and other factors. Party Categories for real estate lawyers, for example, might include Landlord, Tenant, Purchaser, Seller, or General Contractor. Party Categories for bankers and accountants might include Lender, Borrower, or Subscriber. In many cases, this step is critical because the appropriateness of an Archived Comment may depend upon the party on whose behalf it was made. The Archived Comments to a provision governing the computation of rent under a commercial lease, for example, will differ dramatically depending upon whether they are made on behalf of the landlord or the tenant.

By way of illustration, let us assume that the Current Document is a commercial lease agreement, and the user is reviewing the Current Document on behalf of the tenant. The program displays a dialog box and prompts the user to identify a Party Category for the party on whose behalf the Current Document is being reviewed. The dialog box includes a list of all Party Categories ("Archived Party Categories") previously created during previous sessions by users of the Database. The dialog box also includes a blank text box into which the user can enter a new Party Category ("New Party Category") for the Current Document. Let us assume that there is no Archived Party Category for Tenant. The user enters Tenant in the blank text box and saves the entry to the Database.

In another embodiment of the invention, the user can use the right key of the mouse to click on an Archived Party Category to delete or amend it. If, for example, an Archived Party Category exists for Lessee, but most of the users sharing the Database prefer to use the term Tenant, the user might want to change the name of the Archived Party Category from Lessee to Tenant. The use of the right mouse key in this manner is a common feature of popular operating systems and known to those of ordinary skill in the art. See, e.g., the Windows Explorer file manager found in the Windows 95/98/XP operating systems from Microsoft Corporation.

Step Five: Database Search

Archived Comments are stored in one or more Databases. As discussed above, these Databases might be Local Databases, Remote Databases, or Removable Databases, and combinations of these. The Databases are partitioned by Document Category and Party Category (collectively, "Categories"). In embodiments, there may be a single database file or multiple database files. When multiple database files, these may be distributed over multiple disks, servers, or machines. Multiple database files may be searched. Each file may contain different types or categories of information or similar information, but from different users.

In Step Five (step 320), the Program searches the Databases (a "Database Search") for those Archived Comments that correspond to Archived Phrases the same as or similar to Current Phrases. FIG. 14 shows a user screen for selecting a database query. The Program begins by parsing out the Current Document into Current Phrases. A Current Phrase might include a line of text, a single sentence, a single paragraph, a given number of consecutive words, or otherwise. Each Current Phrase serves as a set of search terms for the Database Search. The results of the Database Search include those Archived Phrases (and their associated Archived Comments) that correspond to the Current Phrases.

In another embodiment, the Database Search is reversed, such that each Archived Phrase serves as a set of search terms, and the Program searches the Present Document for those Current Phrases the same as or similar to Archived Phrases. The results of the Database Search remain the same, i.e., those Archived Phrases (and their associated Archived Comments) that correspond to the Current Phrases.

In another embodiment, the Current Phrases serve as the search terms, but the Program searches the Database directly for Archived Comments that contain words or phrases the same as or similar to the Current Phrases, as distinguished from the indirect search for Archived Comments based on corresponding Archived Phrases. The results of the Database search include those Archived Comments that correspond to the Current Phrases.

Upon completion of the Database Search, those Current Phrases for which Archived Comments are found are converted to hypertext ("Comment Links") in the Current Document. When the user clicks on a Comment Link, a list (a "Comment List") is displayed featuring those Archived Comments that correspond to that Comment Link. The Archived Comments in a given Comment List are ranked based upon the probability distribution between the Current Phrase and the Archived Phrases associated with such Archived Comments.

The Database Search can be accomplished with statistical data analysis techniques. For example, an embodiment of the invention uses data clustering data analysis techniques, such as hierarchical clustering (agglomerative or divisive) or partitioning (probabilistic clustering, k-medoids methods, or k-means methods). Other data analysis techniques such as those known to those of ordinary skill in the art may also be used. For a discussion of some algorithms in specific implementations of the invention, see, e.g., MacKay, Information Theory, Inference and Learning Algorithms (Cambridge University Press 2003).

The Comment List may include short names assigned to each Archived Comment by its author. A checkbox or radio button might appear next to each Archived Comment so displayed. The user may select an Archived Comment for inclusion in the Comments by checking or unchecking its checkbox or radio button. When the user double clicks a short name, the full text of the Archived Comment might appear in a text dialog box for editing by the user. When the user has finished editing an Archived Comment, the user might be presented with several options, such as canceling the edit, running a spell or grammar checking tool, or both, on the edited version, saving the edited version to the Current Phrase, saving the edited version to the Local Database, and closing the dialog box. The user might also have the option to add a New Comment to the Comment List for the Current Phrase. These are all options common to word processing and spreadsheet programs and known to those of ordinary skill in the art. See, e.g., the Spelling and Grammar, Save, and Save As functions in Word 2003 from by Microsoft Corporation and WordPerfect 10 from Corel Corporation.

Step Six: New Comment Entry and Database Building

In Step Six (step 324), the user identifies Selected Phrases for the addition of New Comments. When the user highlights a Selected Phrase, a text dialog box appears, and the user is prompted to enter a New Comment. FIG. 15 shows a user screen for highlighting of words or phrases in the document for making a new comment entry. FIG. 16 shows a pop-up window with a comment list and comment for an accompanying phrase in the main document screen highlighted. FIG. 17 shows a pop-up window with a comment in the comment list for another phrase in the main document screen highlighted. FIG. 18 shows a user screen for a defined term check selecting words in the main screen with the cursor, mouse, or other selection tool. FIG. 19 shows a list popping up as a result of the selected words.

When the user has finished entering a New Comment, he or she might be presented with several options, such as canceling the New Comment, running a spell or grammar checking tool, or both, on the New Comment, saving the New Comment to the Selected Phrase, saving the New Comment to the Local Database, adding an additional New Comment, and closing the dialog box.

There are many more options that may be made available to the user. For example, other available options may include those found in word processing and spreadsheet programs and known to those of ordinary skill in the art. See, e.g., the Spelling and Grammar, Save, and Save As functions in Word 2003 from by Microsoft Corporation and WordPerfect 10 from Corel Corporation.

Once a New Comment is saved to a Selected Phrase, the Selected Phrase is converted to a Comment Link, and the New Comment is added to the Comment List for that Comment Link. The Comment List for that Comment Link can be opened at any time by double clicking that Comment Link.

For the database, an initial starting set of comments for phrases may be provided as a prebuilt database for the user. When a user purchases software of the invention, there may be different comment databases available, each comments intended for a specific set of users. For example, attorneys and lawyers may purchase the software with a comments database specific for their profession. Entertainment attorneys may purchase a comments database specific for entertainment attorneys (e.g., including comments ensuring a celebrity's publicity rights are protected). Patent attorneys may purchase a comments database specific for patent attorneys (e.g., including comments for ensuring ideas are protected). Divorce attorneys may purchase a comments database specific for divorce attorneys (e.g., including comments for making an ironclad prenuptial agreement). Medical doctors may purchase a comments database specific for medical doctors (e.g., including comments assisting in reducing incidence of malpractice). Sports agents may purchase a comments database specific for sport agents.

A system of the invention may have access to multiple databases of different types (e.g., database for patents and contracts). The user may be provided the option to use one or more of the databases during use. Using the feature, a user can ensure that the appropriate comments appear for the type of document the user will be reviewing.

A comments database may be built or compiled through the addition of user comments. Prebuilt databases may be supplemented in this way. In a specific implementation, comments are added to a database such as the local database, remote database, or removable database. The local database may be a database on the local machine. The remote database may be a database on a server or at a location that is accessible by one or more users. A removable database is a database which can be removed from the machine (such as on a USB flash drive), so a user may take the database to use at another machine. Comments may be added to a single database or multiple databases, whether local, remote, or removable.

The addition of comments may be automatic. For example, all comments for phrases are added automatically at one time. All comments for phrases not found in the database are automatically added. There may be multiple comments in the database for one phrase. One or more comments for phrases may be added at a time with the approval of the user. For example, the system determines one or more comments for phrases are not in the database, so user is asked for each comment whether to add the comment (and phrase or associated word or group of words) to the database. Thus, by building a database of comments in such a way, an organization may share their comments database work product.

For example, over time, some attorneys at a law firm who have developed a specialty in a particular area will have added many comments for phrases to a database for this specialty. Then, when a new attorney joins the firm, and the new attorney is given a task of drafting a new document in this specialty, the new attorney will be provided the benefit of creating a document with the wealth of intelligence of the law firm (through the compiled comments database), even though one of the more senior attorneys has not yet reviewed the document. With the system of the invention, an associate attorney may find it more enjoyable billing 2000 or more hours (as is typical for modern large law firms such as those in New York City) and also provide improved work product. Therefore, an organization or workgroup may collaborate and share information more easily.

Step Seven: Defined Term Check

A step 326 searches the Comments included in the Current Document for Defined Terms, i.e., those capitalized and other terms that may have been utilized in a manner specific to the Current Phrase or Archived Phrase to which they were made. FIG. 20 shows a user screen selecting a term check menu option and an accompanying term check pop-up window.

In the case of a commercial lease, for example, a Comment might use the term "Tenant." This term might conflict with the use of the term "Lessee" in the Current Document or the other Comments thereto. This step offers the user the opportunity to search the Comments for Defined Terms and replace them with alternative terms.

Step Eight: Comment Format Selection

Step Eight (step 329) concerns the selection of a Commenting Format for the presentation of the Comments. FIG. 21 shows a comment format menu option and selected having comment interlineated in the document. Some Commenting Formats include a formal comment letter, a comment table, an interlineated version of the Current Document, or a digitally encoded text version of the Current Document with Comment Links. The formal comment letter would include a letter, on the letterhead of the user or the user's company and addressed to the intended recipient of the user's comments. It would set forth each comment, referencing the location of the Selected Phrases to which it applies by section, paragraph, page, or line number, or combination of these.

A comment letter to a commercial lease, for example, might read, in part, "In Section 3.6, line 7, please clarify that neither interest nor late payment penalties shall apply to late rental payments until Lessor has given Lessee written notice of nonpayment, and Lessee has failed to cure the same within five business thereafter."

A comment chart is similar in substance to a formal comment letter, except that the comments are presented in the form of a table, with, for example, the location of the Selected Phrases appearing in the first column, and the comments in the second column.

An interlineated version of the Current Document might include a graphical image of the Current Document in the same form originally received, reduced to 75 percent of its original size in order to increase the size of the top, bottom, and side margins. Each comment would then be inserted into the margins adjacent the Selected Phrases to which it applies. Each comment and its Selected Phrases could be further associated by corresponding numbers (e.g., comment 7 corresponds to Selected Phrases segment 7), connecting lines (i.e., lines from each comment to its Selected Phrases segment), or including location references in the comments (e.g., "3.6:7: Please clarify that neither interest nor late payment penalties shall apply to late rental payments until Lessor has given Lessee written notice of nonpayment, and Lessee has failed to cure the same within five business thereafter.")

A digitally encoded text version of the Current Document with Comment Links is similar to the version displayed on the user's screen upon completion of the commenting session. See Step Nine below. In this case, the Comments are revealed in the form of Comment Lists whenever the recipient double clicks a given Comment Link.

Some commenting formats might be preferred over others, depending upon the customs of a given industry or territory, the operational style of the user or the recipient, or other factors.

Step Nine: Comment Display

At Step Nine (step 333), the Comments are displayed in the Commenting Format on the user's screen or other display device. FIG. 22 shows a user screen for a display comments menu option and comments being show on the left-hand side of the document window. In an embodiment, the user is given the opportunity to edit the Comments as they are displayed in the Commenting Format and to save those edits to the Comments and/or the Archived Comments.

Step Ten: Comment Transmission

The final step (step 337) involves the transmission of the Comments in the selected Commenting Format to one or more intended recipients. FIG. 23 shows a user screen for a transmit comments menu option and selecting sending by e-mail of the document with comments. Several means of transmission include conventional mail, personal delivery, facsimile transmission, e-mail (as body text or attachment), or web site link. Other transmission means that are known to those of ordinary skill in the art may also be used.

FIG. 4 shows a flow diagram of an embodiment of a Local Database search for Archived Comments. Through a user device 403 such as a computer, a user retrieves a document without comments 409. The user uses a flow as discussed above. The user device searches a local database 412 for current phrases in the current document. As a result of the search, the user device finds archived phrases and archived comments and these are inserted into the current document. The user can save the current document with comments 416. In other embodiments, the database searched may include database other than the local database or additional databases to the local database, such as the remote or a removable database. Multiple local or other databases may be searched.

FIG. 5 shows a flow diagram of an embodiment of the identification of Selected Phrases and the entry of New Comments. The figure has similar comments to FIG. 4, a user device 5013, current document without comments 509, local database 512, and current document with comments 516. In this diagram, a user 501, via the user device, adds new comments and selected phrases to the document, and these new comments and selected phrases are added to the local database. In other embodiments, the new comments and selected phrases may be added to databases other than the local database, such as the remote or a removable database. Multiple local or other databases may be added to.

FIG. 6 shows a flow diagram of an embodiment of a Remote Database search. Through a user device 603 such as a computer, a user retrieves a document without comments 609. The user uses a flow as discussed above. The user device searches a remote database 612 for current phrases in the current document. A different user than the user performing the search (referred to as a nonuser in the figure) may have input archived phrases and archived comments into the remote database.

As a result of the search, the user device finds archived phrases and archived comments and these are inserted into the current document. The user can save the current document with comments 616. In other embodiments, the database searched may include database other than the remote database or additional databases to the remote database, such as the local or a removable database. Multiple remote or other databases may be searched.

FIG. 7 shows a flow diagram of an embodiment of a Removable Database search. Through a user device 703 such as a computer, a user retrieves a document without comments 709. The user uses a flow as discussed above. The user device searches a removable drive database 712 (i.e., database stored on a removable drive medium) for current phrases in the current document. A different user than the user performing the search (referred to as a nonuser in the figure) may have input archived phrases and archived comments into the removable drive database.

As a result of the search, the user device finds archived phrases and archived comments and these are inserted into the current document. The user can save the current document with comments 716. In other embodiments, the database searched may include database other than the removable drive database or additional databases to the removable drive database, such as the local or remote databases. Multiple removable or other databases may be searched.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A computer system for generating comments to a document, the system comprising:
one or more computer devices, the computer system configured to:
electronically communicate with a database, which database is embodied on a computer-readable medium configured to store at least a first phrase and a first comment related to the first phrase, wherein the first comment comprises a request to modify at least a portion of the language of the first phrase, and
the computer system programmed via executable instructions at least to enable a first user to:
acquire a document as or on behalf of a first party to the document, wherein the document comprises an agreement between at least two parties to the document, wherein the document was at least one of prepared or selected by a second user as or on behalf of a second party to the document, wherein the first phrase and the first comment were prepared before the document was at least one of prepared or selected by the second user, wherein the first user is different than the second user, and wherein the first party is different than the second party,
compare content of the document with content of the database,
identify the first phrase as relevant to a phrase in the document,
after the first phrase is identified as relevant to a phrase in the document, receive the first comment from the database,
after the first comment is received from the database:
associate the first comment with the relevant phrase in the document, and
make the first comment available for editing by the first user,
after the first comment has been associated with the relevant phrase in the document and made available for editing by the first user, make comment format options available to the first user, and
after the comment format options have been made available to the first user, make the first comment available for transmission to at least one of the second user or the second party in at least one of the optional comment formats.

2. The system of claim 1, wherein the first phrase and the first comment were stored in the database by the first user.

3. The system of claim 1, wherein the manner by which the content of the document is compared with the content of the database comprise at least one of the following:
searching the database, wherein the search criteria comprise phrases contained in the document, or
searching the document, wherein the search criteria comprise phrases contained in the database.

4. The system of claim 1, wherein the database is at least one of:
accessible over a communications network;
embodied on a removable drive medium; or
embodied on the computer system.

5. A method for generating comments to a document, the method comprising:
providing a database embodied on a computer-readable medium,
wherein the database is configured to store at least a first phrase and a first comment related to the first phrase,
the first comment comprises a request to modify at least a portion of the language of the first phrase, a computer system comprising one or more computer devices is configured to electronically communicate with the database, and the computer system is programmed via executable instructions at least to enable a first user to:

acquire a document as or on behalf of a first party to the document, wherein the document comprises an agreement between at least two parties to the document, wherein the document was at least one of prepared or selected by a second user as or on behalf of a second party to the document, the first phrase and the first comment were prepared before the document was at least one of prepared or selected by the second user, the first user is different than the second user, and the first party is different than the second party, compare content of the document with content of the database, identify the first phrase as relevant to a phrase in the document, after the first phrase is identified as relevant to a phrase in the document, receive the first comment from the database, after the first comment is received from the database:
associate the first comment with the relevant phrase in the document, and
make the first comment available for editing by the first user, after the first comment has been associated with the relevant phrase in the document and made available for editing by the first user, make comment format options available to the first user, and after the comment format options have been made available to the first user, make the first comment available for transmission to at least one of the second user or the second party in at least one of the optional comment formats.

6. The method of claim 5, wherein the first phrase and the first comment were stored in the database by the first user.

7. The method of claim 5, wherein the manner by which the content of the document is compared with the content of the database comprise at least one of the following:
searching the database, wherein the search criteria comprise phrases contained in the document, or
searching the document, wherein the search criteria comprise phrases contained in the database.

8. The method of claim 5, wherein the database is at least one of:
accessible over a communications network;
embodied on a removable drive medium; or
embodied on the computer system.

9. A method for generating comments to a document, the method comprising:
providing a computer system comprising one or more computer devices, the computer system configured to electronically communicate with a database,
wherein the database is embodied on a computer-readable medium configured to store at least a first phrase and a first comment related to the first phrase,
the first comment comprises a request to modify at least a portion of the language of the first phrase, and
the computer system is programmed via executable instructions at least to enable a first user to:
acquire a document as or on behalf of a first party to the document, wherein the document comprises an agreement between at least two parties to the document, wherein the document was at least one of prepared or selected by a second user as or on behalf of a second party to the document, the first phrase and the first comment were prepared before the document was at least one of prepared or selected by the second user, the first user is different than the second user, and the first party is different than the second party, compare content of the document with content of the database, identify the first phrase as relevant to a phrase in the document, after the first phrase is identified as relevant to a phrase in the document, receive the first comment from the database, after the first comment is received from the database:
associate the first comment with the relevant phrase in the document, and
make the first comment available for editing by the first user, after the first comment has been associated with the relevant phrase in the document and made available for editing by the first user, make comment format options available to the first user, and after the comment format options have been made available to the first user, make the first comment available for transmission to at least one of the second user or the second party in at least one of the optional comment formats.

10. The method of claim 9, wherein the first phrase and the first comment were stored in the database by the first user.

11. The method of claim 9, wherein the manner by which the content of the document is compared with the content of the database comprise at least one of the following:
searching the database, wherein the search criteria comprise phrases contained in the document, or
searching the document, wherein the search criteria comprise phrases contained in the database.

12. The method of claim 9, wherein the database is at least one of:
accessible over a communications network;
embodied on a removable drive medium; or
embodied on the computer system.

13. A system for generating comments to a second document, the system comprising:
a database embodied on a computer-readable medium configured to store at least a first phrase related to a first document and a first comment related to the first phrase,
wherein a document comprises a legal agreement between at least two different parties to the document,
wherein the first comment comprises a request to modify at least a portion of the language of the first phrase,
at least one of the first phrase or the first comment is associated in the database with at least one document category based on a legal subject matter of the first document,
at least one of the first phrase or the first comment is associated in the database with at least one party category based on a legal role of at least one party to the first document,
a computer system comprising one or more computer devices, the computer system configured to electronically communicate with the database, and the computer system programmed via executable instructions to at least:

enable a user as or on behalf of a party to the second document to compare content of the second document with content of the database, wherein the first document and the second document cover different transactions, the user specifies at least one document category for the second document based on the subject matter of the second document and at least one party category for the party to the second document based on a legal role of the party under the second document, identify the first phrase as relevant to a phrase in the second document, the at least one document category for the second document, and the at least one party category for the party to the second document, after the first phrase is identified as relevant to a phrase in the second document, the at least one document category for the second document, and the at least one party category for the party to the second document, receive the first comment from the database, after the first comment is received from the database:
associate the first comment with the relevant phrase in the document, and
make the first comment available for editing by the first user, after the first comment has been associated with the relevant phrase in the document and made available for editing by the first user, make comment format options available to the first user, and after the comment format options have been made available to the first user, make the first comment available for transmission to at least one of the second user or the second party in at least one of the optional comment formats.

14. The system of claim 13, wherein the first phrase and the first comment were stored in the database by the user.

15. The system of claim 13, further comprising at least one of the following:
the document category for at least one of the first phrase, the first comment, or the second document is selected from a listing of document categories, or
the party category for at least one of the first phrase, the first comment, or the party to the second document is selected from a listing of party categories.

16. The system of claim 13, wherein the manner by which the content of the second document is compared with the content of the database comprise at least one of the following:
searching the database, wherein the search criteria comprise phrases contained in the second document, or
searching the second document, wherein the search criteria comprise phrases contained in the database.

17. The system of claim 13, wherein the database is at least one of:
accessible over a communications network;
embodied on a removable drive medium; or
embodied on the computer system.

18. A method for generating comments to a second document, the method comprising:
providing a database embodied on a computer-readable medium configured to store at least a first phrase related to a first document and a first comment related to the first phrase,
wherein a document comprises a legal agreement between at least two different parties to the document,
wherein the first comment comprises a request to modify at least a portion of the language of the first phrase, at least one of the first phrase or the first comment is associated in the database with at least one legal document category based on a legal subject matter of the first document, at least one of the first phrase or the first comment is associated in the database with at least one party category based on a legal role of at least one party to the first document, a computer system comprising one or more computer devices is configured to electronically communicate with the database, and the computer system is programmed via executable instructions to at least:
enable a user as or on behalf of a party to the second document to compare content of the second document with content of the database, wherein the first document and the second document cover different transactions, the user specifies at least one document category for the second document based on the subject matter of the second document and at least one party category for the party to the second document based on a legal role of the party under the second document, identify the first phrase as relevant to a phrase in the second document, the at least one document category for the second document, and the at least one party category for the party to the second document, after the first phrase is identified as relevant to a phrase in the second document, the at least one document category for the second document, and the at least one party category for the party to the second document, receive the first comment from the database, after the first comment is received from the database:
associate the first comment with the relevant phrase in the document, and
make the first comment available for editing by the first user, after the first comment has been associated with the relevant phrase in the document and made available for editing by the first user, make comment format options available to the first user, and after the comment format options have been made available to the first user, make the first comment available for transmission to at least one of the second user or the second party in at least one of the optional comment formats.

19. The method of claim 18, wherein the first phrase and the first comment were stored in the database by the user.

20. The method of claim 18, further comprising at least one of the following:
the document category for at least one of the first phrase, the first comment, or the second document is selected from a listing of document categories, or
the party category for at least one of the first phrase, the first comment, or the party to the second document is selected from a listing of party categories.

21. The method of claim 18, wherein the manner by which the content of the second document is compared with the content of the database comprise at least one of the following:
searching the database, wherein the search criteria comprise phrases contained in the second document, or
searching the second document, wherein the search criteria comprise phrases contained in the database.

22. The method of claim 18, wherein the database is at least one of:
accessible over a communications network;

embodied on a removable drive medium; or
embodied on the computer system.

23. A method for generating comments to a second document, the method comprising:
    providing a computer system comprising one or more computer devices, the computer system configured to electronically communicate with a database,
    wherein the database is embodied on a computer-readable medium configured to store at least a first phrase related to a first document and a first comment related to the first phrase,
    wherein a document comprises a legal agreement between at least two different parties to the document,
    the first comment comprises a request to modify at least a portion of the language of the first phrase,
    at least one of the first phrase or the first comment is associated in the database with at least one legal document category based on a legal subject matter of the first document,
    at least one of the first phrase or the first comment is associated in the database with at least one party category based on a legal role of at least one party to the first document, and
    the computer system programmed via executable instructions to at least:
        enable a user as or on behalf of a party to the second document to compare content of the second document with content of the database, wherein the first document and the second document cover different transactions, the user specifies at least one document category for the second document based on the subject matter of the second document and at least one party category for the party to the second document based on a legal role of the party under the second document,
        identify the first phrase as relevant to a phrase in the second document, the at least one document category for the second document, and the at least one party category for the party to the second document,
        after the first phrase is identified as relevant to a phrase in the second document, the at least one document category for the second document, and the at least one party category for the party to the second document, receive the first comment from the database,
        after the first comment is received from the database:
            associate the first comment with the relevant phrase in the document, and
            make the first comment available for editing by the first user,
        after the first comment has been associated with the relevant phrase in the document and made available for editing by the first user, make comment format options available to the first user, and
        after the comment format options have been made available to the first user, make the first comment available for transmission to at least one of the second user or the second party in at least one of the optional comment formats.

24. The method of claim 23, wherein the first phrase and the first comment were stored in the database by the user.

25. The method of claim 23, further comprising at least one of the following:
    the document category for at least one of the first phrase, the first comment, or the second document is selected from a listing of document categories, or
    the party category for at least one of the first phrase, the first comment, or the party to the second document is selected from a listing of party categories.

26. The method of claim 23, wherein the manner by which the content of the second document is compared with the content of the database comprise at least one of the following:
    searching the database, wherein the search criteria comprise phrases contained in the second document, or
    searching the second document, wherein the search criteria comprise phrases contained in the database.

27. The method of claim 23, wherein the database is at least one of:
    accessible over a communications network;
    embodied on a removable drive medium; or
    embodied on the computer system.

* * * * *